United States Patent Office 3,550,033
Patented Dec. 22, 1970

3,550,033
CHROMIUM-DOPED GdAlO₃ HIGH ENERGY STORAGE LASER MATERIAL
Robert C. Ohlmann, Palo Alto, Calif., and Robert Mazelsky, Monroeville, Pa., assignors to Westinghouse Electric Corporation, Pittsburgh, Pa., a corporation of Pennsylvania
Filed June 11, 1968, Ser. No. 736,220
Int. Cl. C09j *1/04*
U.S. Cl. 331—94.5                6 Claims

ABSTRACT OF THE DISCLOSURE

A new and improved laser material, for use as a laser in association with pump radiation is made having the formula $GdAl_{1-x}Cr_xO_3$, where $x$ may take any value from 0.0001 to 0.01 inclusive.

BACKGROUND OF THE INVENTION

This invention relates to laser crystals, particularly those for optically pumped lasers. More particularly, this invention relates to laser crystals of gadolinium aluminum oxide doped with chromium and the use of such crystals in Q-switched lasers.

State-of-the-art laser materials have inherent limitations on their energy output when they are used in the energy-storage Q-switched mode of laser oscillations. The limitations on the energy output of present materials are measured by a determination of the fluorescence decay time of their active ions and the spectral width of the fluorescence line as measured by fluorescence spectroscopy. The limitations on energy output are also determined by the maximum concentration of active ions that is permissible before quenching or redistribution of their fluorescence becomes significant. The reason these factors limit the maximum energy output in the Q-switch mode of laser operation is that they all limit the attainable amount of stored energy.

One of the best state-of-the-art laser materials for Q-switched operation is ruby ($Al_2O_3$ doped with 0.05 to 0.1 atom percent chromium) which has a fluorescence decay time of about 3 milliseconds. Concentrations of over 0.1 atom percent active chromium ion are not useful in ruby because resulting interaction between the chromium ions quenches fluorescence causing it to have a shorter decay time. Excess chromium also redistributes the fluorescence spectrum of ruby narrowing the width of the fluorescence line.

SUMMARY OF THE INVENTION

Accordingly, it is an object of this invention to provide a new and improved laser crystal for use in the resonant cavity of a laser generator in association with a radiation pumping means.

It is another object of this invention to provide a high-energy-storage laser material having a long fluorescence decay time and a broad fluorescence spectrum which can be doped as high as 1 atom percent with active chromium ions.

Briefly, the foregoing objects are accomplished by producing crystals of $GdAl_{1-x}Cr_xO_3$, where $x$ may take any value from 0.0001 to 0.01 inclusive. Chromium concentrations over 0.1 atom percent (where $x > 0.001$) may be advantageously employed. The preferred range of $x$ is between .001 and .005.

The most obvious advantage of the laser material of this invention is its long fluorescence decay time. This has been measured at 18 milliseconds at 77° K. and 13 milliseconds at room temperature (about four times longer than ruby laser crystals) and these values are relatively independent of concentration in the range of $x$ disclosed. In addition, the fluorescence spectrum line width of about 50 A. for this new laser material is four times greater than the width of the two lines in the fluorescence spectrum of ruby at room temperature and the gain for equal concentrations is only $\frac{1}{16}$ of ruby. Therefore, this material may be efficiently excited using flash-lamps having a longer flash period than is used with ruby, with correspondingly higher excitation energies.

Of equal importance is the fact that the material of this invention may be used at chromium concentrations five to ten times greater than that used in Q-switched ruby lasers. The higher energies which may be used to excite this material means that most of the chromium ions can be excited and thus the stored energy and energy output can be much larger than are obtainable with ruby.

BRIEF DESCRIPTION OF THE DRAWING

For a better understanding of the nature and objects of the invention, reference may be had to the following drawings, in which.

DESCRIPTION OF THE PREFERRED EMBODIMENTS

Figure 1:
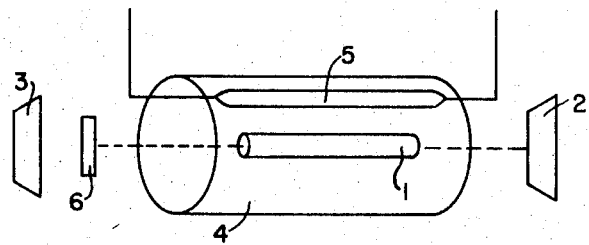
FIG. 1 shows a laser generator utilizing the composition of this invention as a laser rod.

Referring now to FIG. 1 of the drawing showing a laser generator, the crystalline laser rod 1 is placed between parallel resonators 2 and 3 which form a resonant optical cavity with the laser rod therebetween. The resonator 2 is highly reflective while the resonator 3 is of lower reflectivity. The rod 1 is supported coaxially within a hollow cylinder 4, the inside surface of which is highly reflective. A radiation pumping means in this case a linear xenon flashlamp 5 is located parallel to and within the cylinder 4. In operation the flashlamp 5 is pulsed to produce a surge of pumping radiation which is directed to the laser rod 1. One method of accomplishing Q-switching is to use a shutter 6 between the laser rod and resonator 3. The shutter 6 is closed during excitation by the flashlamp and then opened at the instant desired to permit emission of the stored energy.

Although the laser material of this invention can be used in standard lasers it is most effective in Q-switched lasers. In Q-switched lasers, the energy from the flash lamp is stored in the laser material as atoms in an excited state, usually for several milliseconds. After such a storage period the laser is allowed to go into coherent oscillation and much of the stored energy is released over a short period of time, tens of nanoseconds, resulting in high peak powers.

The Q-switch device can be varied such as to allow near zero or near 100 percent transmission of light at the laser freqency. When the Q-switch device is at zero percent transmission the energy that is put into the crystal is stored in the crystal. The amount of energy that can be stored depends on when spontaneous emission occurs which is in turn dependent on crystal parameters such as decay time and fluorescent spectra linewidth. After pumping, the Q-switch device is opened to permit 100 percent transmission at which point stimulated emission occurs and a giant spike of energy results.

The Q-switching means can be either mechanical, electro-optic, or a bleachable filter. The mechanical Q-switch may for example be a simple chopper or a rotating mirror. The electro-optic Q-switch is dependent on the use of polarized light so a polarizer may be required between the laser crystal and the Q-switch. The zero percent and 100 percent transmission of polarized light-through the electro-optic material is controlled by application of an electric field. The bleachable filter is a material that has zero percent transmission until the incident light energy reaches a level sufficient for bleaching the filter after which, it is 100 percent transmitting. For a detailed discussion of the various types of Q-switched lasers see William V. Smith et al., The Laser, McGraw-Hill Book Co., 1966, pp. 142 to 160 herein incorporated by reference.

The longer the effective fluorescence decay time of the laser material, the longer the flash lamp can deliver energy. However, if the energy is delivered to the laser material over a period that is about the same or longer than the effective fluorescence decay time of the laser material, this energy is inefficiently used and high energy storage does not occur. The reason for this is that the material is losing stored energy at a faster rate than it is receiving it.

The refractory host material used in this invention is $GdAlO_3$. This compound has a distorted perovskite-type structure. The simple cubic perovskite unit cell may be visualized as a cube having eight $Gd^{+++}$ ions at the corners and an $Al^{+++}$ ion at the body center, and having six $O^{--}$ ions at the center of the faces. The true orthorhombic structure of $GdAlO_3$ has four formula units per unit cell, although all $Al^{+++}$ ions are at crystallographically equivalent sites which only have inversion symmetry. The distortion of the unit cell from a simple cubic structure is small since a pseudocell may be constructed with sides 3.731, 3.731, 3.734 A. and a corner angle of 90.6°. When $Cr^{+++}$ the doping agent of this invention is added in small quantities it will substitute for the $Al^{+++}$ preferentially.

In the preparation of the laser rod material of this invention 1.0 mole $Gd_2O_3$, 0.995 mole $Al_2O_3$ and 0.005 mole $Cr_2O_3$, all of 99.999% purity, were mixed together and melted in an iridium crucible. An approximate melting point of 2005° C. was obtained by means of a series of pyrometer readings uncorrected for emissivity.

The crystals were pulled from the melt at about 2030° C. using the standard Czochralski technique, well known in the art and described in an article by J. Czochralski in Zeitschrift fur Physikalische Chemie, vol. 92, pp. 219–221 (1918). A recent description of the process is found in an article by H. Nassau and L. G. Van Uitert in Journal of Applied Physics, vol. 31, p. 1508 (1960). The power source was a Westinghouse 10 kHz. 30 kw. motor generator set. Pulling and rotation rates were 6 mm./hr. and 40 r.p.m. respectively. Pull rates of 1–10 mm./hr. and rotation rates of 40–80 r.p.m. may be used. The crucible should be ½ to ⅔ full. By proper positioning of the crucible in the coil a thermal gradient of approximately 50° C. was maintained between the temperature of the crucible wall at the top of the crucible and at the liquid level. Several crystals were grown of approximately ¼ inch diameter and ½–2 inch length. Cooling rates of the pulled crystals varied from 2 to 6 hours.

Fluorescence measurements of the resulting $$GdAl_{.995}Cr_{.005}O_3$$

laser crystals were made using a Jarrell-Ash 1 m. Ebert grating monochrometer (600 l./mm.) Crystals were excited by a 1 kw. AH 6 high pressure mercury lamp, and the fluorescence detected at the exit slit by a cooled RCA 7102 photomultiplier. All low temperature fluorescence measurements were made the sample immersed in the cryogenic fluid.

Figure 2:
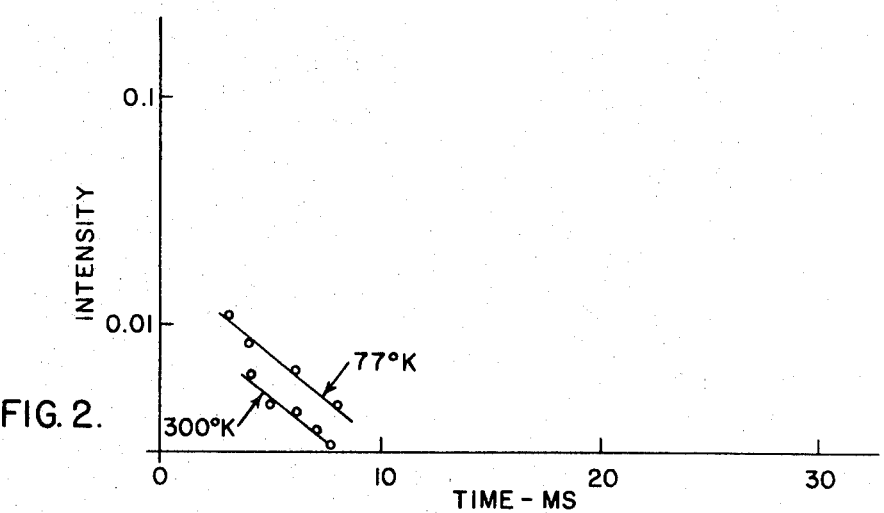
FIG. 2 is a semi log graph of the fluorescence decay time of the composition of this invention.

For a laser rod composition $GdAl_{.995}Cr_{.005}O_3$ the gain is only about one third of ruby, so that the effective room temperature lifetime, as measured by oscilloscope, is 8–10 milliseconds depending on sample size. This is about twice as long as ruby fluorescence decay time and gain is still sufficiently high to overcome reasonable cavity losses when the laser is Q-switched and made to oscillate. FIG. 2 shows decay curves on a semilog plot for the R-line fluorescence of $GdAlO_3:Cr_{.005}$ at 77° K. and 300° K.

The absorption spectrum of $GdAl_{.995}Cr_{.005}O_3$ shows two bands in the visible typical of $Cr^{+++}$. The peaks lie at 4150 A. and 5650 A. having peak absorption cross sections of $7.5 \times 10^{-20}$ cm.$^2$ and $2.6 \times 10^{-20}$ cm.$^2$ respectively.

Figure 3:
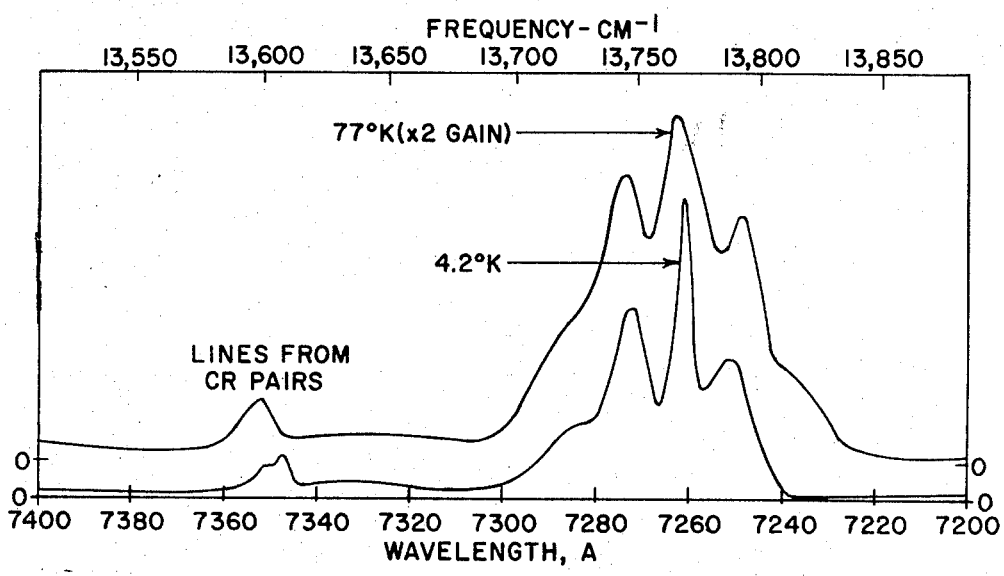
FIG. 3 is a graph of the fluorescence spectra of the composition of this invention at low temperatures.

The fluorescence emission spectrum of $GdAlO_3:Cr$ at 4.2° and 77° K., shown in FIG. 3, arises from $Cr^{+++}$. At 77° K. the overall line width remains about 50 A. Approximately 50% of the total fluorescence appears within this single line, even at 0.5 atom percent $Cr^{+++}$, although pair emission lines take about 10% of the emission at this concentration.

We claim as our invention:

1. A laser crystal having the composition $$GdAl_{1-x}Cr_xO_3$$

where $x$ may take any value from 0.0001 to 0.01 inclusive.

2. The laser crystal of claim 1 wherein $x$ has a value greater than 0.001.

3. The laser crystal of claim 1 wherein $x$ has a value between 0.001 and .005.

4. The laser crystal of claim 1 wherein $x$ has a value of about 0.005.

5. In a laser generator comprising a resonant cavity, a Q-switching means, a laser crystal within said resonant cavity and a radiation pumping means supplying radiation to the laser crystal, the improvement comprising a laser crystal having the composition $GdAl_{1-x}Cr_xO_3$, where $x$ may take any value from 0.0001 to 0.01 inclusive.

6. The laser generator of claim 5 wherein the radiation pumping means is a flashlamp.

References Cited

UNITED STATES PATENTS 3,292,102  12/1960  Byrne _____ 331—94.5

RODNEY D. BENNETT, Primary Examiner

W. T. RIFKIN, Assistant Examiner

U.S. Cl. X.R.

252—301.4